(12) United States Patent
Zvonar

(10) Patent No.: US 6,694,272 B1
(45) Date of Patent: Feb. 17, 2004

(54) MICROCONTROLLER CONTROLLED VOLTAGE REFERENCE

(75) Inventor: Greg Zvonar, Winchester, MA (US)

(73) Assignee: Galaxy Power, Inc., Westborough, MA (US)

( * ) Notice: Subject to any disclaimer, the term of this patent is extended or adjusted under 35 U.S.C. 154(b) by 167 days.

(21) Appl. No.: 10/011,009

(22) Filed: Nov. 8, 2001

(51) Int. Cl.$^7$ .............................................. G01R 27/02
(52) U.S. Cl. ...................................................... 702/64
(58) Field of Search ........................... 702/64; 713/320, 713/324; 363/25, 127, 95; 323/283; 341/144; 324/73.1

(56) References Cited

U.S. PATENT DOCUMENTS

| | | | |
|---|---|---|---|
| 5,289,113 A | * | 2/1994 | Meaney et al. ............. 324/73.1 |
| 6,105,142 A | * | 8/2000 | Goff et al. ................... 713/324 |
| 2002/0194516 A1 | * | 12/2002 | Muratov et al. ............. 713/320 |

* cited by examiner

Primary Examiner—John Barlow
Assistant Examiner—Tung S Lau
(74) Attorney, Agent, or Firm—Cesari and McKenna, LLP

(57) ABSTRACT

A power supply has a digital input to receive Voltage Identification codes (VID codes). A microprocessor within the power supply reads the VID codes and outputs, in response to the VID codes, a digital to analog converter code (DAC code). A digital to analog converter receives the DAC codes, and outputs a reference voltage. A DC to DC unit receives the reference voltage and also receives power from a standard power supply, and the DC to DC unit generates output power at a selected output voltage in response to the reference voltage. A test stand measures the output voltage, and the test stand adjusts the DAC code generated by the microprocessor in response to the VID code in order to supply power at the desired output voltage by the power supply, in response to a desired input VID code. The test stand adjusts the DAC code generated by the microprocessor in response to the VID code so that a particular VID code causes the DC to DC unit to generate output power at the voltage specified by the VID code.

25 Claims, 16 Drawing Sheets

500

| VID CODE (502) | DESIRED OUTPUT VOLTAGE (504) |
|---|---|
| $VID_{MIN}$ (506) | $V_{OUT\ MIN}$ (508) |
| VID (EX) (514) | $V_{OUT}$ (EX) (516) |
| ⋮ (518) | ⋮ (520) |
| $VID_{MAX}$ (510) | $V_{OUT\ MAX}$ (512) |

VID / $V_{OUT}$ TABLE

TABLE SPECIFIED BY COMPUTER MANUFACTURE

| DAC CODE (602) | V<sub>OUT</sub> TO COMPUTER (604) |
|---|---|
| LDC (608) | $V_{OUT}(LDC)$ (610) |
| HDC (612) | $V_{OUT}(HDC)$ (614) |

DAC CODE / OUTPUT VOLTAGE TABLE

FIG. 6

MICROCONTROLLER CONTROLLED VOLTAGE REFERENCE

BACKGROUND OF THE INVENTION

1. Field of the Invention

This invention relates to precision voltage reference sources, and more particularly to variable precision voltage reference sources.

2. Background Information

A power supply for a computer requires a precision reference voltage for the power component of the power supply. The reference voltage is often referred to as a "set point" voltage. The set point voltage has a number of requirements. For example, the computer requires accuracy of the set point voltage of better than ±0.5%. Secondly, modem computers require smaller voltages, some set point requirements being less than one volt. At low voltage outputs, accuracy of the set point is dominated by both the use of resistors, and by op-amp errors such as individual device dependent offset voltages. Further, some computers now require over 30 different voltage set points, and each has an accuracy requirement. The computer requests voltages by use of Voltage Identification Codes (VID codes), and may output a different VID code for each voltage level which it requests from the power supply.

Even further, precision voltage settings for a reference voltage for a DC/DC converter need to be adjusted to compensate for the temperature dependence of the reference voltage, resistor values, and offset errors of operational amplifiers, in order to maintain a constant voltage output to the computer from the DC/DC converter as the temperature of the unit varies.

Besides computers, an increasing number of electronic devices require power sources at different voltages. Particularly, power is required at voltage levels which are selected by a processor generating VID code commands. Further, it is important that power be delivered at the voltage specified by the VID code.

The traditional solutions for achieving the above design requirements of supplying power at a voltage specified by a VID code are to use expensive precision resistors, that is resistors of at least 0.1% tolerance, or better, and to have manual adjustment facility within the precision reference power supply. Also, expensive low offset operational amplifiers need to be used, and these may require manual unit to unit trimming in order to obtain the desired output voltages. Further, the use of positive temperature coefficient components is sometimes necessary in order to compensate for the temperature dependence of the voltage reference, and other error sources.

A power supply having better means for supplying the multiple accurate set point voltage requirements of modem electronic design is desirable.

SUMMARY OF THE INVENTION

A power supply has a digital input to receive Voltage Identification codes (VID codes). A microprocessor within the power supply reads the VID codes and outputs, in response to the VID codes, a digital to analog converter code (DAC code). A digital to analog converter receives the DAC codes, and outputs a reference voltage. A DC to DC unit receives the reference voltage and also receives power from a standard power supply, and the DC to DC unit generates output power at a selected output voltage in response to the reference voltage. A test stand measures the output voltage, and the test stand adjusts the DAC code generated by the microprocessor in response to the VID code in order to supply power at the desired output voltage by the power supply, in response to a desired input VID code. The test stand adjusts the DAC code generated by the microprocessor in response to the VID code so that a particular VID code causes the DC to DC unit to generate output power at the voltage specified by the VID code.

A precision reference voltage is generated by the digital to analog converter in response to the DAC code, and the precision reference voltage is applied to a DC to DC converter which receives power from a standard power supply.

In an exemplary embodiment of the invention, the computer generating the VID codes is the load receiving power at the voltages specified by the VID codes.

In a further exemplary embodiment of the invention, a pulse width modulation unit is used for the digital to analog converter to generate the precision reference voltage.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

The invention description below refers to the accompanying drawings, of which:

FIG. 5 is a requirements table supplied by a manufacturer of a computer;

FIG. 6 is a table giving DAC codes with voltage outputs to a computer;

DETAILED DESCRIPTION OF AN ILLUSTRATIVE EMBODIMENT

Figure 1:
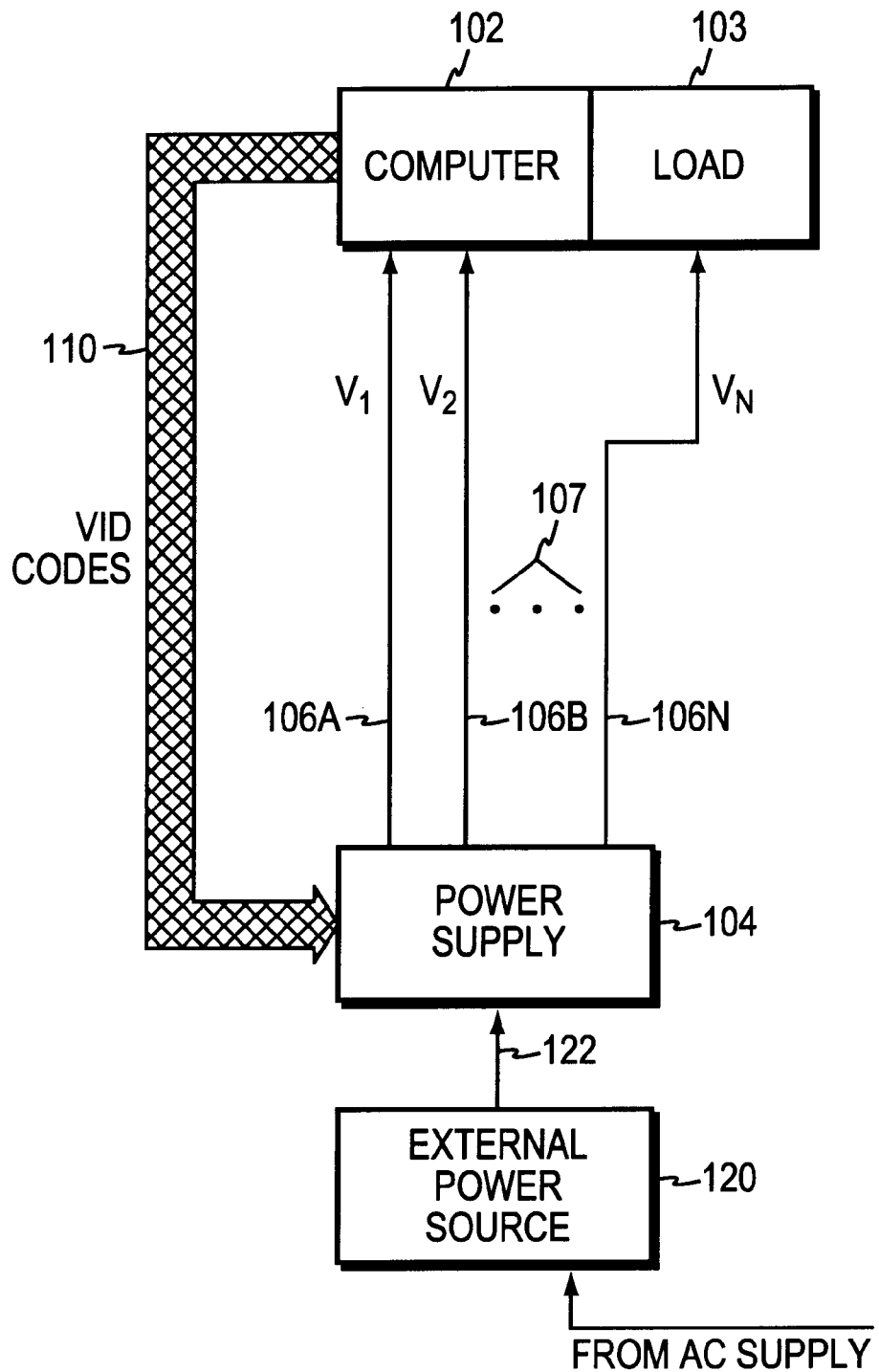
FIG. 1 is a block diagram of a power supply and a computer.

Turning now to FIG. 1, computer 102 and power supply 104 are connected by power supply lines 106A, 106B . . . 106N, etc. Power supply line 106A supplies power at voltage $V_1$ to the computer. Power supply line 106B supplies power at voltage $V_2$ to computer 102. Power supply line 106N supplies power at voltage $V_N$ to computer 102, etc.

Three dots 107 indicate that power may be supplied to computer 102 at many different voltage levels, etc.

Digital supply lines 110 supply voltage identification codes (VID codes), that is digital codes, by the computer to power supply 104. The VID codes are digital codes supplied by the computer to the power supply to tell the power supply what voltages to supply on the different power supply lines, 106A, 106B . . . 106N, etc.

In a first embodiment of the invention, the power supplied at voltages VI . . . VN through power lines 106A . . . 106N is used to power computer 102.

In a second embodiment of the invention load 103 is supplied by one or more power lines such as power lines 106A . . . 106N, and computer 102 uses VID codes as the power requirements of load 103 dictate. In this second embodiment of the invention computer 102 serves to obtain power for load 103 at voltage levels required by load 103.

External power source 120 supplies power at a standard voltage, for example at a voltage between 12 Volts and 48 Volts, to power supply 104 through power line 122. For example, external power source 120 may be capable of supplying power at the standard voltage through power line 122 at 10 Amperes to 20 Amperes, or through 100 Amperes, etc.

Figure 2:
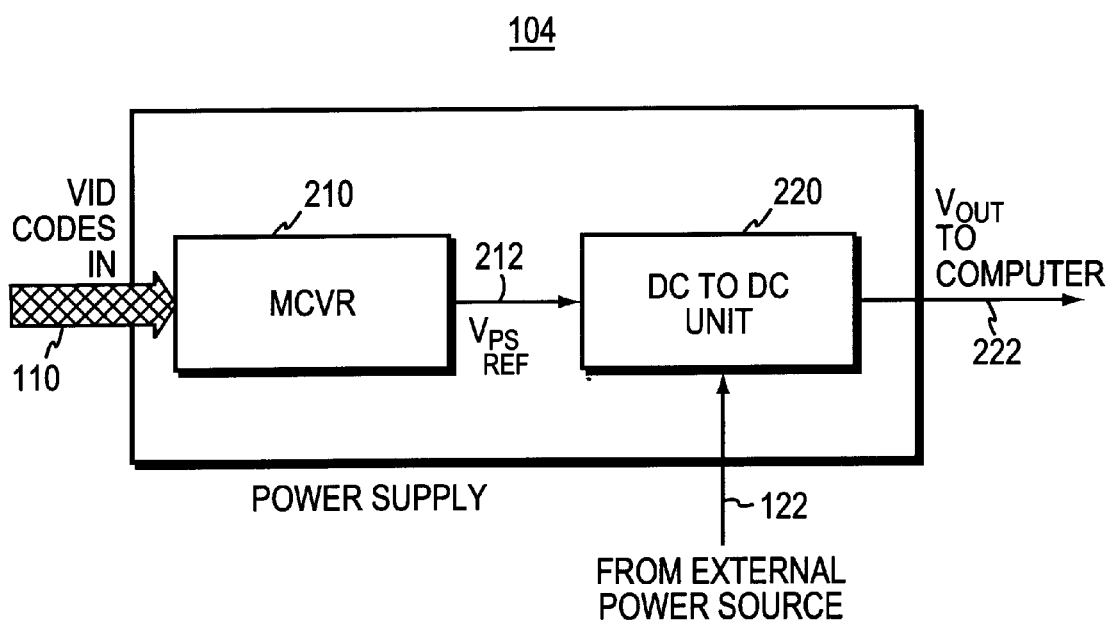
FIG. 2 is a block diagram of a power supply.

Turning now to FIG. 2, internal structure of power supply 104 is shown. The VID code supplied on digital lines 110 are received by microcontroller controlled voltage reference (MCVR) 210. MCVR 210 supplies a precision reference voltage 212 to DC to DC converter unit 220. DC to DC converter unit 220 supplies an output voltage to the computer on output line 222. Output line 222 may be any one of the power supply lines 106A, 106B, . . . , 106N, etc.

DC to DC converter unit 220, for example, is often referred to as a "power stage" because it receives power through power line 122 from an external power source, and receives a precision voltage through line 212, and in response to both the external power received through power line 122 and the precision voltage received through line 212, the DC to DC unit generates a desired output voltage at line 222, and supplies power at a current required by the load while maintaining the output voltage substantially constant on line 222. Further, for example, the DC to DC unit and the external power source 120 may be regarded together as a "power stage" which receives AC power and delivers well regulated DC power on line 222, in response to the precision reference voltage supplied on line 212, etc.

Figure 3:
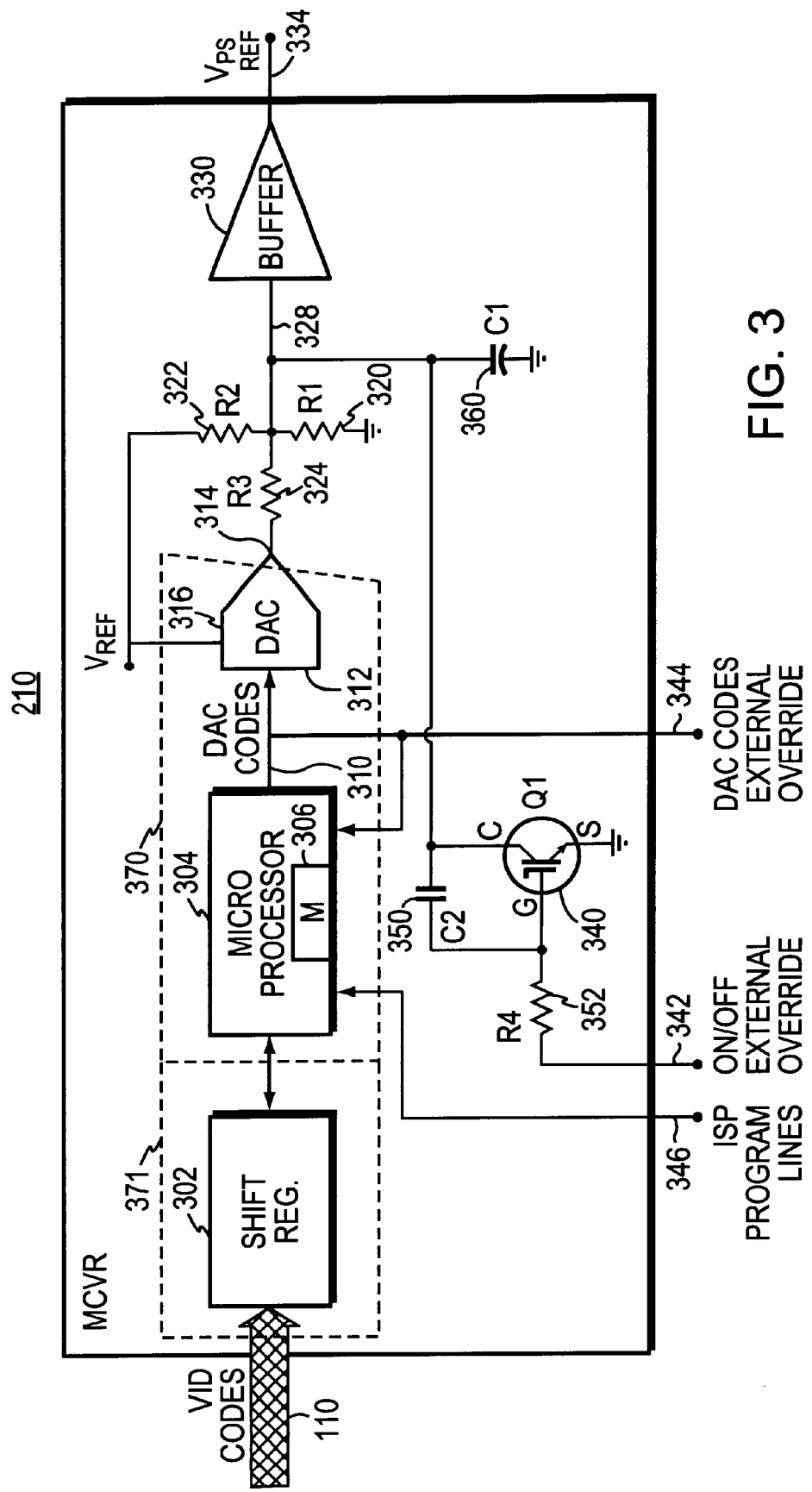
FIG. 3 is an internal schematic diagram of a MCVR.

Turning now to FIG. 3, a block diagram of the internal structure of a representative MCVR 310 is shown. The VID codes on line 110 are received into a shift register 302. Microprocessor 304 reads shift register 302, and stores the VID codes in its memory unit 306. Microprocessor 304 executes a computer program, and produces digital to analog converter codes (DAC codes) 310, and supplies them to digital to analog converter 312. A reference voltage is applied to DAC 312 at line 316. Digital to analog converter 312 converts the DAC codes into an output voltage between its terminal 314 and ground, in response to both the DAC codes and the applied reference voltage on line 316. The voltage divider circuit composed of resistors R1 320, R2 322, and R3 324 provide a desired output voltage at point 328. The voltage at point 328 is supplied to buffer 330, and buffer 330 produces the output reference voltage (V PS REF) at point 334. Output reference voltage 334 is the voltage at line 212 of FIG. 2, supplied by the MCVR 210 to the DC to DC converter unit 220.

Buffer 330 may be made from one or more operational amplifiers (OP-AMPs). An offset voltages for one unit of an OP-AMP may differ from the corresponding offset voltage for another OP-AMP of the same model number and manufacturer, because of variations in the manufacturing process. Accordingly, the invention provides a convenient and low cost method for individually tuning a MCVR 210 unit to deliver a desired output voltage, and further, to deliver power at a desired output voltage over a range of output currents.

Transistor Q1 340 provides a means for turning the output voltage 334 on or off. When external override signal line 342 is logically "raised" transistor 340 turns on and shorts point 328 to ground, thereby zeroing output voltage 334. When external override line 342 is logically "low", transistor Q1 is off and output voltage 334 has its normal value.

DAC codes external override line 344 provides a means for an external circuit to provide DAC codes to digital to analog converter 312. The DAC codes external override line 344 suppresses the DAC codes produced my microprocessor 304, and supplies the DAC codes directly to digital to analog converter 312.

The In Circuit Serially Program Lines (ISP lines) 346 permit programming of microprocessor 304 by use of an external unit.

Box 370, drawn in dashed lines, indicates that a single computer chip may include both microprocessor 304 and DAC 316. Further, box 371, also drawn in dashed lines, indicates that shift register 302 may also be included in a chip which includes microprocessor 304 and DAC 316.

Figure 4:
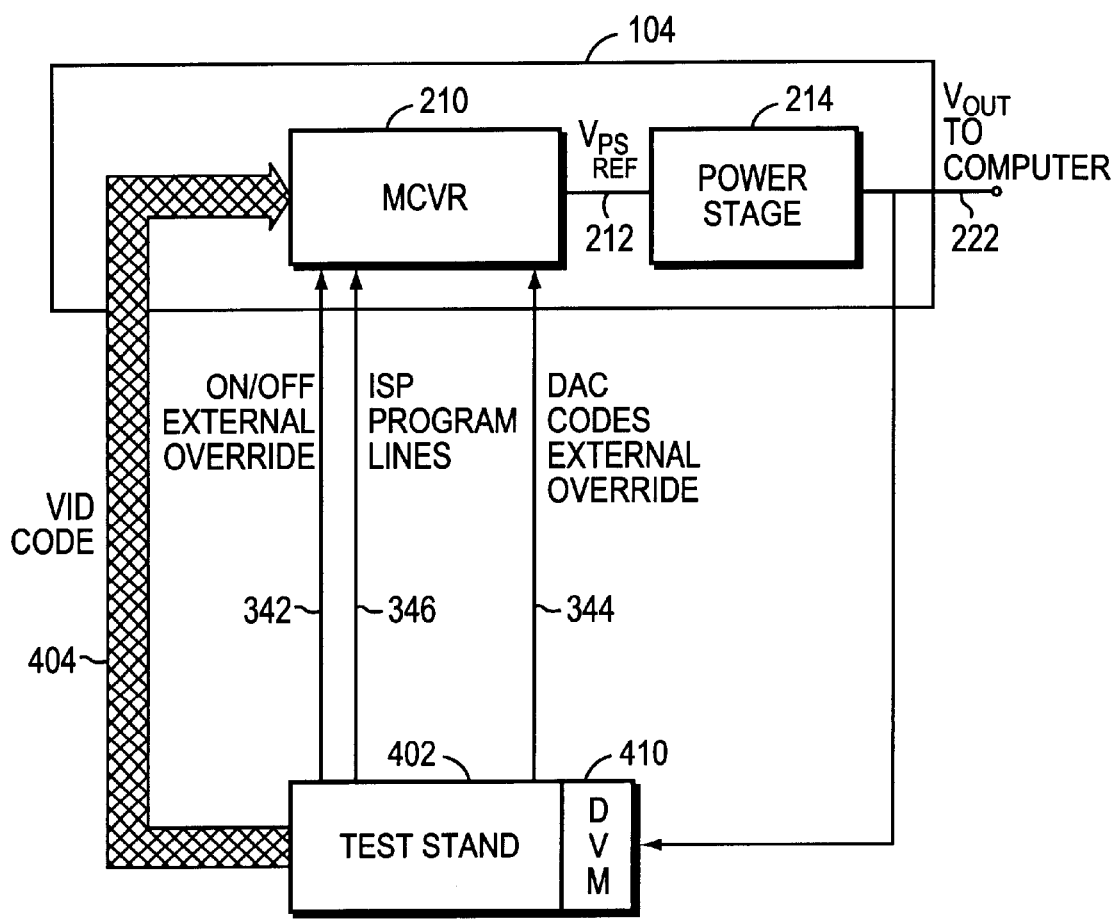
FIG. 4 is a block diagram of a power supply connected to a test stand.

Turning now to FIG. 4, a power supply 104 is shown connected to a test stand 402. Test stand 402 supplies VID codes to MCVR unit 210 along VID code lines 404. Test stand 402 supplies on/off external override logic on line 342. Test stand 402 supplies ISP programming on ISP program lines 346 to MCVR 210. Test stand 402 supplies DAC codes to MCVR 210 along "DAC codes external override lines" 344. Test stand 402 has an internal digital volt meter (DVM) 410. DVM 410 reads the output voltage of power supplied by DC to DC unit 220 at output terminal 222. Test stand 402 is used to adjust MCVR 210 so that the reference voltage supplied at line 212 to DC to DC unit 220 produces a desired output voltage at terminal 222, as selected by a VID code supplied by VID code lines 404. That is, the power supply 104 is programmed by test stand 402 to respond to VID codes supplied along VID code lines 404 to produce a desired output voltage at output terminal 222.

Turning now to FIG. 5, a table 500 specified by the manufacturer of a computer, for example computer 102, is shown. Column 502 contains entries for digital codes, referred to as Voltage Identification Digital codes, or VID codes. Column 504 contains entries having corresponding desired output voltages from a power supply, for example, on output voltage lines 106A, 106B, . . . 106N, 222, etc. as specified by the corresponding VID code entry in column 502.

Entry 506 is a VID code for a minimum output voltage to computer 102, and the minimum output voltage is specified in entry 508. A maximum VID code is at entry 510, and the corresponding desired maximum output voltage is at entry 512. Entry 514 incates an intermediate VID code, and entry 516 represents the exemplary desired output voltage from the power supply, at entry 516. Three dots 518 indicate that a large number of VID codes may be included in table 500, and three dots 520 are the corresponding desired output voltages for the VID codes 518. Table 500 is normally specified by a computer manufacturer, and a manufacturer of power supply 104 must design the power supply to provide the desired output voltages 504 for the corresponding VID codes 502.

Turning now to FIG. 6, table 600 gives digital to analog converter codes (DAC codes) versus output voltages from power supply 104, for example on output lines 106A, 106B, 106N, or at voltage output line 222.

The correspondence between a DAC code and the output voltage depends on a number of factors, for example the voltage divider network composed of R1 320, R2 322, and R3 324. Further, the correspondence between DAC codes and output voltage depends upon the nature of buffer 330. All set point voltages within buffer 330 have a tolerance range, and the output of buffer 330 may depend on the specific buffer unit utilized. That is, a buffer designated by a model number may have differences between individual manufactured units, and these individual unit differences may affect the correspondence between DAC code supplied to DAC 312 and the output voltage of the power supply on line 222.

Column 602 contains entries for DAC codes. Column 604 contains entries for output voltages to the computer as measured at output line 222, or as measured at the equivalent output lines 106A, 106B, ... 106N, etc. Entry 608 contains a low DAC code entry (LDC), and corresponding entry 610 contains the measured output voltage supplied to the computer, V(out(LDC)).

Entry 612 contains a high DAC code (HDC), and corresponding entry 614 contains the measured output voltage supplied to the computer, V(out (HDC)).

Figure 7:
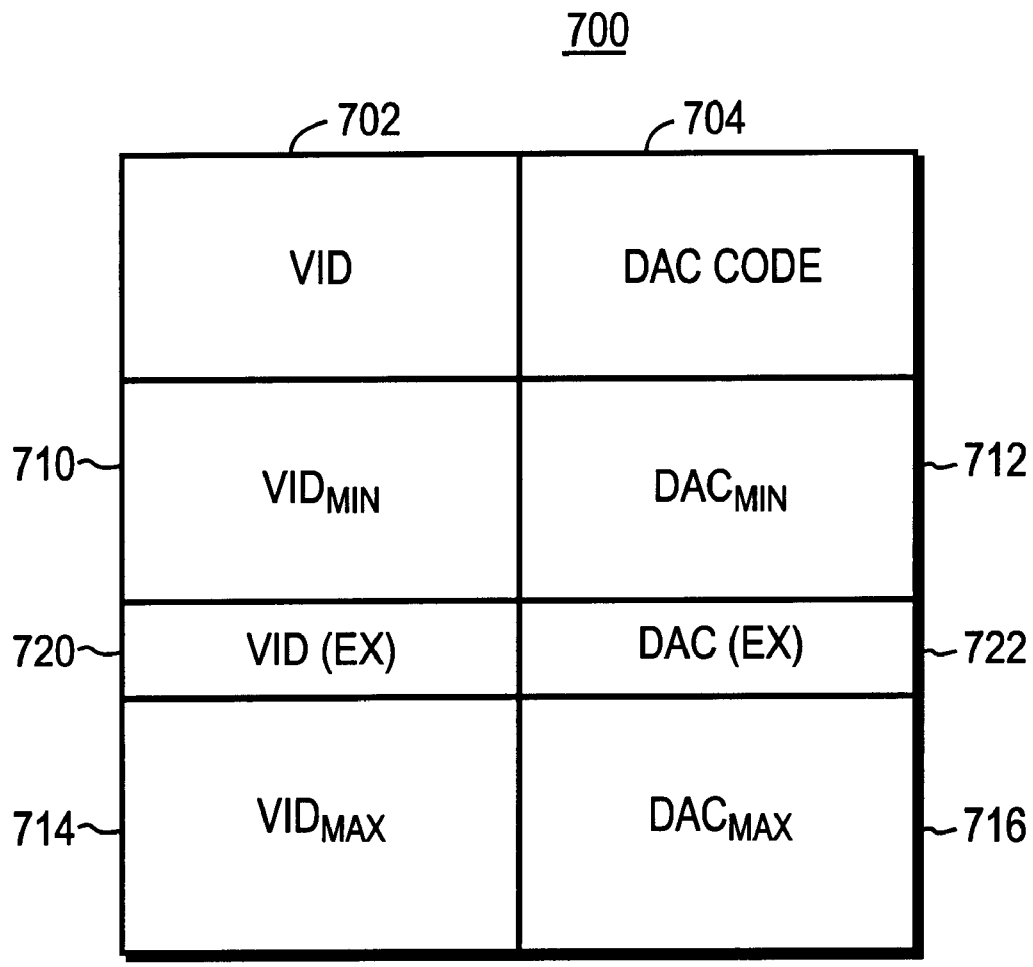
FIG. 7 is a correspondence table between a voltage identification code and a DAC code.

Turning now to FIG. 7, table 700 is a correspondence between voltage identification codes, VID codes, and DAC codes. Column 702 contains entries for VID codes specified by the computer manufacturer in table 500 shown in FIG. 5., and as applied on line 110 to power supply 104. Column 704 contains entries for DAC codes which microprocessor 304 must supply at line 310 to digital to analog converter 312 in order to generate the desired output voltage as specified by the computer manufacture in table 500.

Microprocessor 304 must be programmed to read the VID code from shift register 302 and in response to produce the necessary DAC code to supply to the desired output voltage as specified by the manufacture in table 500. Entry 710 has a VID code for a minimum voltage, as specified at entry 506 of table 500, and entry 712 has the minimum DAC code necessary to produce the desired output voltage. Entry 714 has the VID code for a maximum output voltage as found at entry 510 of table 500, and corresponding entry 716 contains the maximum DAC code needed to produce the desired output voltage as specified by the manufacture at entry 512 of table 500. Entry 720 has an exemplary intermediate VID code, and corresponding entry 722 has the corresponding intermediate DAC code necessary to produce the power supply output voltage specified by the manufacturer for the VID code at entry 720.

Figure 8:
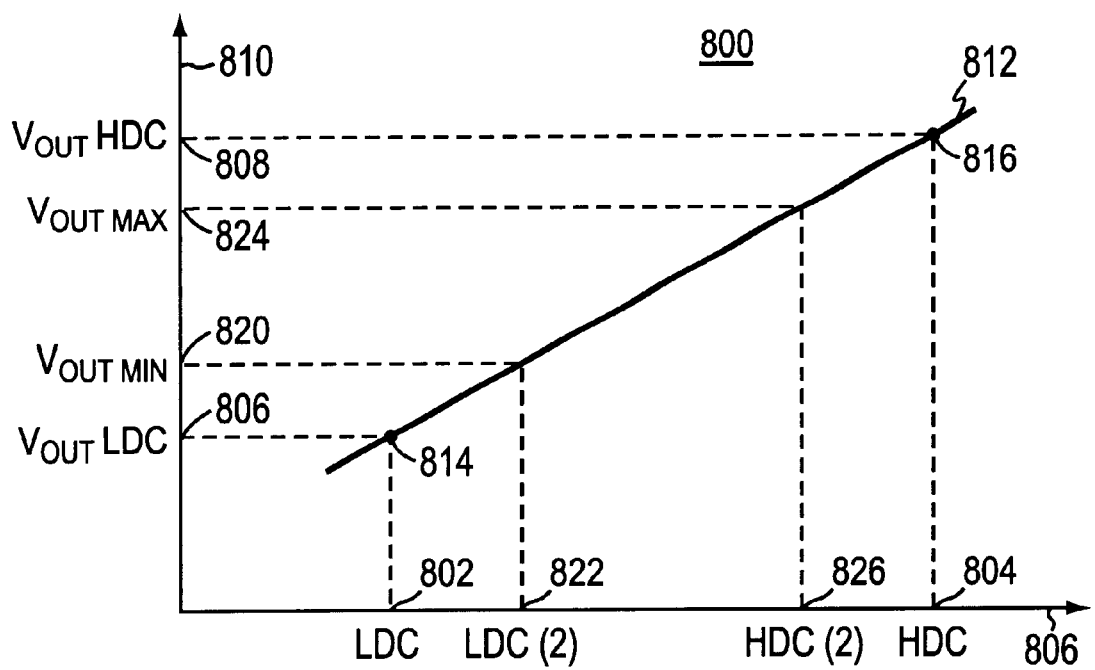
FIG. 8 is a graph showing a relationship between DAC codes and output voltages from a power supply.
Figure 9:
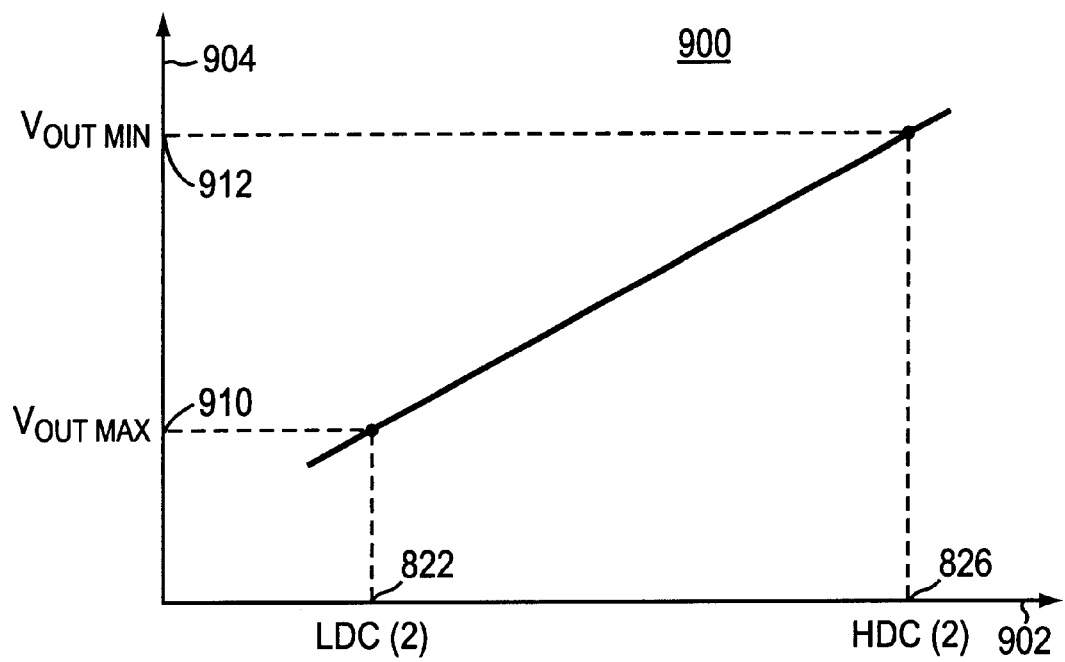
FIG. 9 is a graph showing a relationship between DAC codes and output voltages from a power supply.
Figure 10:
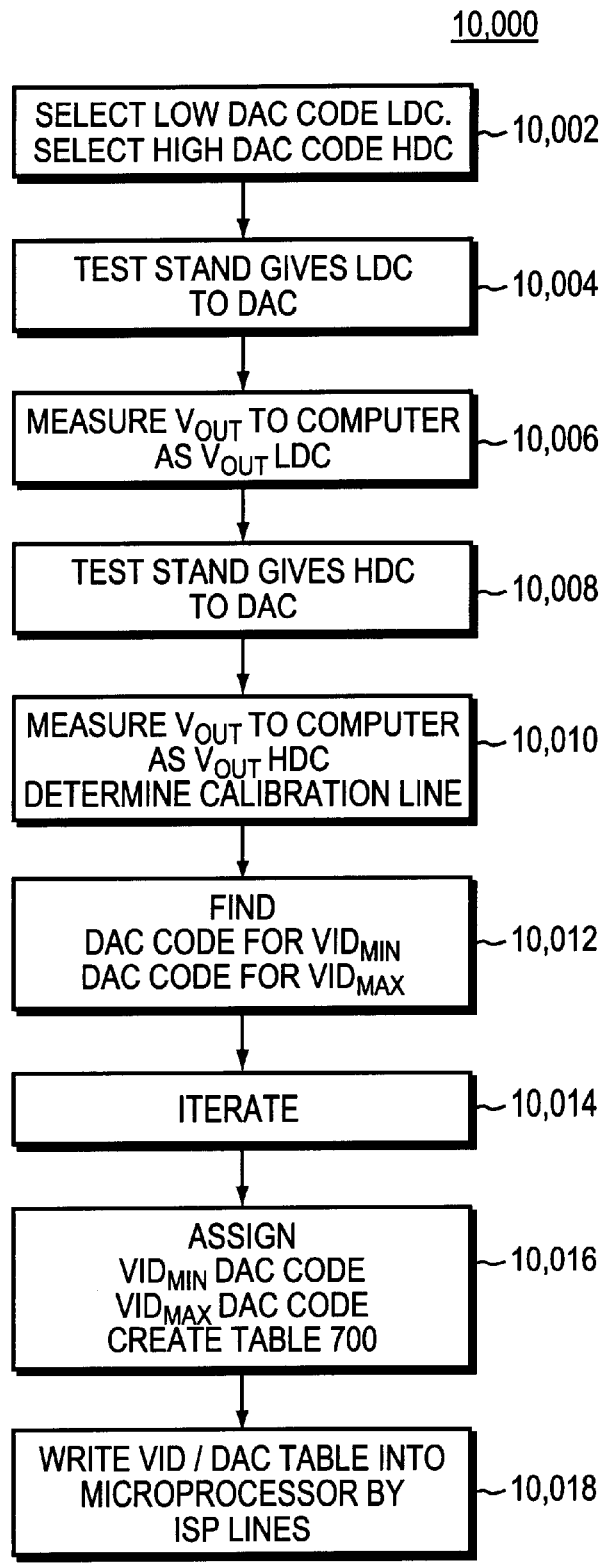
FIG. 10 is a flow chart showing operation of a MCVR.

Turning now to FIG. 8, FIG. 9 and FIG. 10, the operation of calibrating the microprocessor 304 to respond to the supplied VID code at line 110 to supply the manufactures specified output voltage as set forth in table 500 is described. Flow chart 10,000 is shown in FIG. 10. Flow chart 10,000 is a procedure for calibrating power supply 104 by use of test stand 402, with the connections as shown in FIG. 4. At block 10,002 a low DAC code LDC is chosen, and also a high DAC code, HDC is chosen. The LDC and HDC are chose from the range of DAC codes utilized by the particular model of digital to analog converter 312 employed. The value of LDC chosen at block 10,002 is shown in FIG. 8 at point 802, and the value of HDC chosen is shown at point at 804.

The horizontal axis in graph 800, horizontal axis 806, is an axis indicating DAC code values applied at connection line 310 to DAC 312. The vertical axis 810 has voltage values measured by DVM 410 plotted thereon.

After the LDC and HDC values are chosen at block 10,002 the process goes to block 10,004.

At block 10,004 the process has test stand 402 present the low DAC code, LDC, to the digital to analog converter 312 along DAC code external override line 344. As this value of DAC code is applied to digital to analog converter 312, the process goes to block 10,006.

At block 10,006 the digital volt meter (DVM) 410 measures the output voltage at line 222 of power supply 104, and records this as VOUT_LDC. The value of voltage measured by DVM 410 when the low DAC code LDC is applied to digital to analog converter 312 is plotted along vertical axis 810 at point 806. The plotted point 814 is the plot of voltage VOUT_LDC as the measured voltage corresponding to DAC code LDC 802. Upon completion of measurement of output voltage VOUT_LDC by the digital volt meter 401 at block 10,006 the process goes to block 10,008.

At block 10,008 the test stand 402 gives the high DAC code HDC to the digital to analog converter 312 along DAC code external override line 344. The process then goes to block 10,010.

At block 10,010 the DVM 410 measures the output voltage of the power supply 104 at line 222, and records the measured voltage as VOUT_HDC. Point 816 is plotted from the value of HDC on horizontal axis 806, and VOUT_HDC along vertical axis 810.

Straight line 812 is drawn between the two points 814 and 816. Line 812 is referred to as the "calibration line". Calibration line 812 is used to determine the appropriate DAC code to generate a desired output voltage. For example, then DAC code needed to generate a voltage as shown in table 500 to correspond with the desired VID code may be determined from calibration line 812. Calibration line 812 gives a linear interpolation between DAC codes and output voltage on line 222.

Upon both the determination of the VOUT_HDC and the construction of calibration line 812 at block 10,010, the process goes to block 10,012.

At block 10,012 the process uses line 812 in order to determine the correspondence between VID codes read from column 502 of table 500 and the desired output voltages at line 222 of power supply 104. For example, the minimum output voltage VOUT_min 508 is plotted at point VOUT_min 820 on vertical axis 810, and using line 812 the DAC code need to supply the minimum output voltage 508 is determined to lie at point 822, and is represented by the symbol LDC (2). Also, the maximum output voltage 512 is shown plotted at point 824. Line 812 is used to determine at point 826 the DAC code necessary to generate the desired maximum output voltage 512, and the required DAC code is indicated at point 826 and is represented by symbol HDC (2). Upon determination of the values of DAC codes required by linear interpolation line 812 to produce the desired minimum and maximum output voltages as specified by VID codes supplied along lines 110 to the MCVR 210, the process goes to block 10,014.

At block 10,014 process 10,000 iterates to guarantee correspondence between power supply output voltage at line 222 and the corresponding VID code as set forth in table 500 by the computer manufacture. Iteration is necessary because the output voltage on line 222 may not be exactly a linear function of DAC codes applied to DAC 312 at connection line 310.

Turning now to FIG. 9, graph 900 is shown. The iteration of block 10,014 is further described with reference to FIG. 9. Horizontal axis 902 represents the value of DAC code on connection line 310. Vertical axis 904 represents the output voltage measured on output line 222 by digital volt meter 410. The value of low DAC code, LDC(2), determined from graph 800 is plotted on horizontal line 922 at point 822. The high DAC code HDC(2) determined in FIG. 800 at point 826 is plotted at point 826 in FIG. 9. These DAC codes are applied by test stand 402 to connection line 310 as input to digital to analog converter 312, and the corresponding output voltages measured. The measured output voltage corresponding to LDC (2) plotted at point 822 is shown at point 910 as VOUT_min. The measured output voltage corresponding to application of the high DAC code HDC(2) plotted at point 826 is shown as VOUT_max at point 912. In the event that the linear interpolation utilized in FIG. 8 and block 10,012 of the process 10,000 is exact, then the measured output voltage for the low DAC code LDC(2) will be the desired low output voltage 508. Further, if the linear interpolation is exact, the high DAC code HDC(2) will produce a maximum output voltage 912 corresponding with the desired output maximum voltage 512 specified by the computer manufacture in table 500. In the event that the linear interpolation is not exact, then graph 900 is used to do a further interpolation at iteration block 10,014 of the process. The iteration of the linear interpolation is done as shown previously in more detail in graph 800 of FIG. 8. After a few cycles of iteration to determine the DAC code that corresponds with the minimum required voltage 508, and the DAC code on line 310 which corresponds with the maximum output voltage at entry 512, the process accurately determines the DAC code corresponding with the minimum and maximum required voltages. Upon completion of the iteration to determine the DAC codes required by the specifications of the computer manufacture, as set forth in table 500, the process goes to block 10,016.

At block 10,016 the process assigns a DAC code to the maximum VID code from entry 506, and assigns a minimum VID code from entry 510 of Table 5. Also at block 10,016 the process creates table 700. The entries in table 700 give the microprocessor 304 the information necessary to translate a VID code applied along VID code lines 110 into DAC codes to output along connection line 310 as input to the digital to analog converter 312. Upon completion of block 10,016 the process goes to block 10,018.

At block 10,018 the values of table 700 are written into microprocessor memory 306. By use of the entries of table 700, the computer, when connected as shown in FIG. 1 to power supply 104 can supply a VID code along line 110, and the microprocessor 304 will use table 700 to look up the necessary DAC code to supply along connection line 310 in order to obtain the desired output voltage to the computer along a power supply line, for example along power supply line 106A, 106B, 106N, etc.

Upon completion of block 10,018 the test stand 402 is removed from power supply 104. Power supply 104 is now ready for connection to computer 102. Computer 102 supplies a VID code along digital lines 110 to power supply 104. Power supply 104 then responds to the VID code by microprocessor 304 reading the VID code, looking up in table 700 stored in memory 306 the required DAC code to output on connection line 310, and microprocessor 304 then outputs the required DAC code. Power supply 104, in response to that DAC code, then produces the necessary power supply voltage on its output line 222, or the corresponding output power supply lines 106A, 106B, ... 106N, etc.

For example, power supply 104 may have a different DAC for each desired output voltage, and each DAC generates one of the plurality of required output precision reference voltages.

Figure 11B:
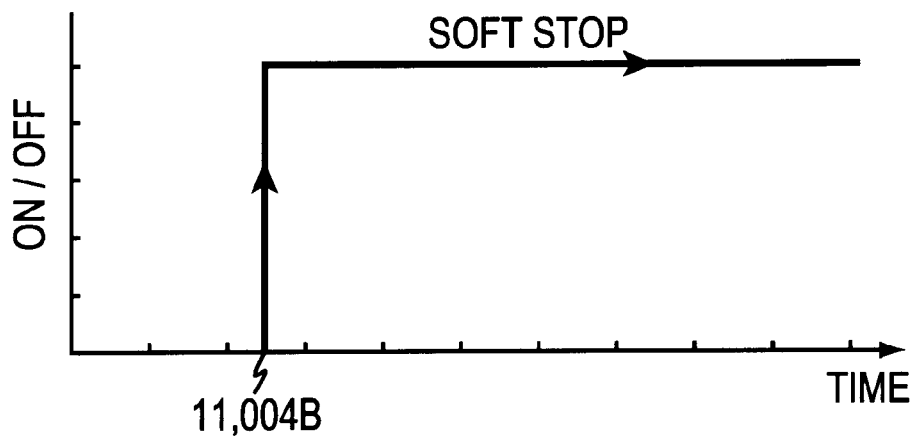
FIG. 11A and FIG. 11B are graphs showing soft stop.
Figure 11A:
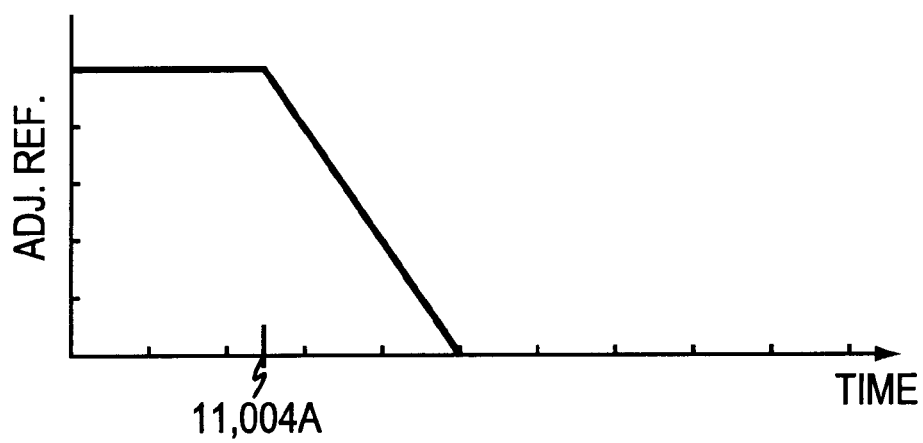

Turning now to FIG. 11A and FIG. 11B, a feature which is built into MCVR 210 is shown. The feature shown in FIG. 11A and FIG. 11B is referred to as "soft stop". FIG. 11B shows the ON OFF signal on line 342. At time point 11,004B the signal on line 342 is switched from "on" to "off". At corresponding time point 11,004A the reference voltage supplied by MCVR 210 at reference voltage output line 334 begins to go to zero (0) in a linear fashion. The values of capacitor C2 350 and resistor R4 352 determine the ramp-down rate of the reference voltage supplied at output point 334. The reference voltage supplied at output point 334 is the reference voltage supplied along line 212 to DC to DC unit 220, and so the output voltage to the computer at line 222 decrease substantially linearly with time. This substantially linear decrease of the voltage supplied to the computer minimizes the effects of induction on the computer as a result of a request in change of voltage, as applied along VID lines 110.

Figure 12B:
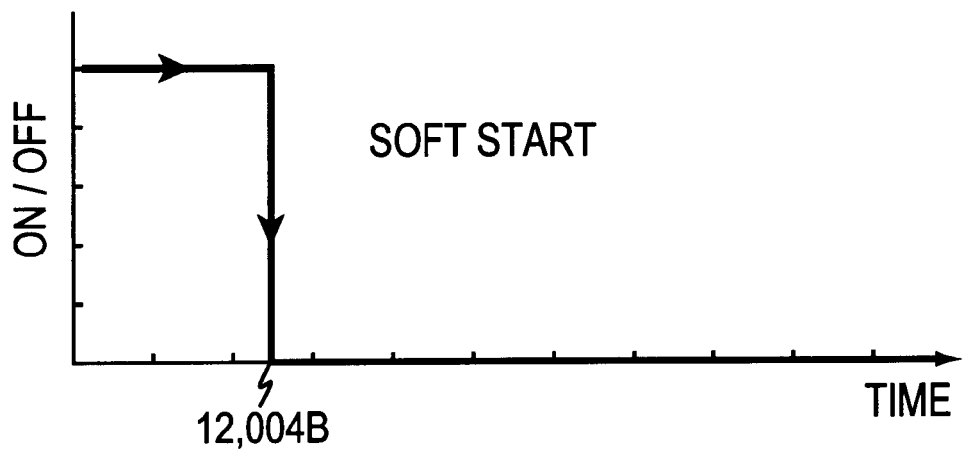
FIG. 12A and FIG. 12B are graphs showing soft start.
Figure 12A:
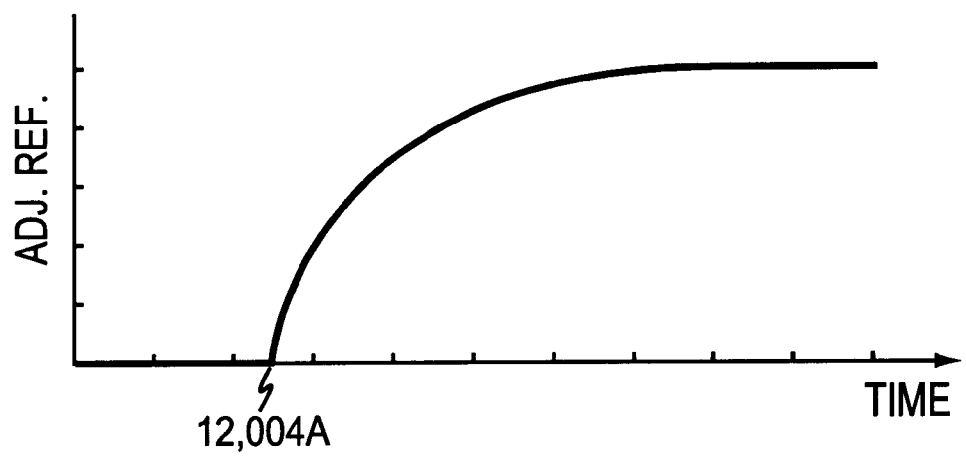

Turning now to 12A and 12B, "soft start" is illustrated. FIG. 12b represents the ON/OFF external override signal 342. At time point 12,004B the ON/OFF signal is turned from "off" to "on". At corresponding time point 12,004A the reference voltage supplied at output point 334 is shown. The soft start mechanism is enacted whenever the ON/OFF signal on the external override line 342 is lowered. Lowering the ON/OFF signal turns off transistor Q1 340, and the power supply reference voltage supplied at line 332 ramps substantially exponentially with time. The time constant of this exponential signal is designed through the choice of the component values of capacitor C1 360, and the values of resisters R1 320, R2 322, and R3 324.

Figure 13:
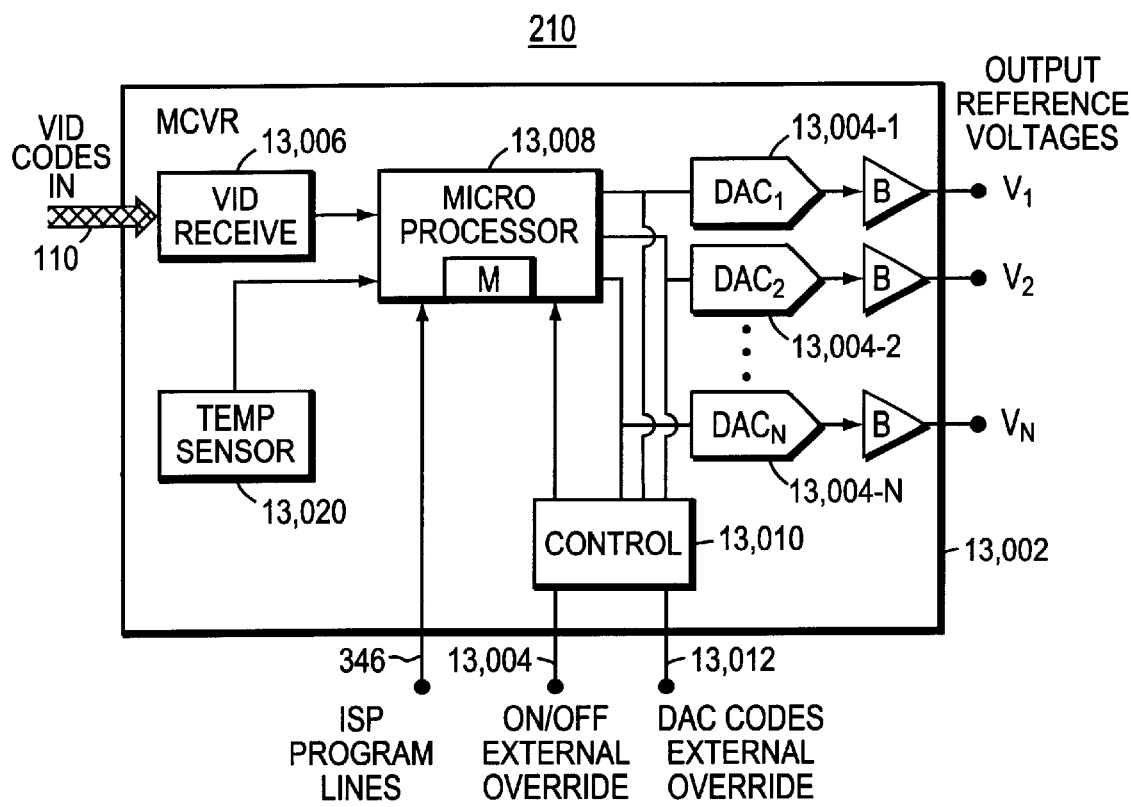
FIG. 13 is a block diagram of an alternative MCVR.

Turning now to FIG. 13 an exemplary alternative embodiment of MCVR 210 is shown. Box 13,002 illustrates a microprocessor controlled voltage reference (MCVR) apparatus having a plurality of output digital to analog circuits DAC-1 13,004-1, DAC-2 13,004-2, ... DAC N 13,004-N, etc. Each DAC generates a different output reference voltage. For example, V1 is generated by DAC 1 13,004-1; V2 is generated by DAC 2 13,004-2; ... and finally VN is generated by DAC N 13,004-N.

VID codes received on line 110 first are received at block 13,006 where they are pre-processed. The VID codes are then input to microprocessor 13,008. Microprocessor 13,008 generates DAC codes for each of the DACs, DAC-1 13,004-1, DAC-2 13,004-2, ... DAC N 13,004-N. Each DAC then generates its required output precision reference voltage V1, V2, ... VN, etc. Each DAC is trimmed through a test stand such as test stand 402 and digital voltmeter 410 to produce the output voltage V1, V2, ... VN as requested by the VID code applied through line 110.

Control block 13,010 provides the means to control the DACs, for example, during trimming of the output voltage using the DAC codes external override lines 13,012. Soft start and soft stop are controlled through external on/off lines 13,004.

Block 13,002 is a block diagram of an apparatus which produces a plurality of desired output precision reference voltages V1, V2, ... VN, as requested by the VID codes applied to MCVR 13,002 by VID lines 110. As indicated by the symbol "VN" a large number of required output precision reference voltages may be produced by the MCVR shown in block 13,002. A test stand such as exemplary test stand 402, and DVM 410 trim the output voltages V1, V2, ... VN to correspond to the voltage requested by the relevant VID code.

Figure 14:
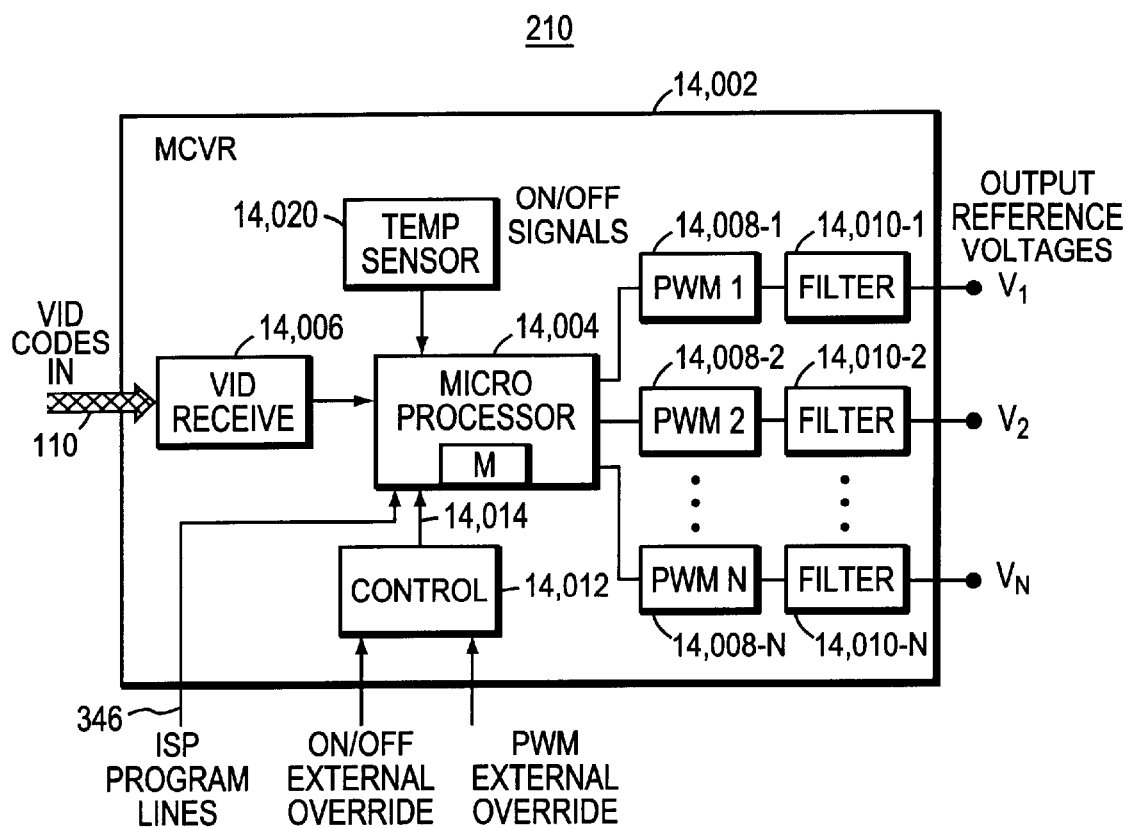
FIG. 14 is a block diagram of an alternative MCVR.

Turning now to FIG. 14, an alternative exemplary embodiment of MCVR 210 is shown in block 14,002. Again, VID codes are applied to microprocessor 14,004 through VID lines 110 and preprocessor 14,006. Microprocessor 14,004 controls pulse width modulation (PWM) units PWM1 14,008-1, PWM2 14,008-2, ... PWMN 14,008-N. The output of each PWM unit goes to a filter, and the output of the filter is a steady DC voltage having the voltage desired as a precision reference voltage. For example, upon command by a VID code, microprocessor 14,004 generates on and off signals applied to PWM1 14,008-1. The output of PWM1 14,008 is applied to filter 14,010-1, and the output of filter 14,010-1 is the required output precision reference voltage V1.

Similarly, another VID code is applied to microprocessor 14,004 through pre-processor 14,006, and in response microprocessor 14,004 generates appropriate on and off signals and applies them to PWM2 14,008-2. The output of PWM2 14,008-2 is applied to filter 14010-2 which then generates output precision reference voltage V2. A plurality of different output precision reference voltages may be produced by the MCVR of block 14,002. For example output precision reference voltage VN is produced by applying an appropriate VID code through VID lines 110 to microprocessor 14,004 through pre-processor 14,006. Microprocessor 14,004 then generates on and off signals for PWMN 14,008-N, and the output of PWMN 14,008-N is applied to filter 14,010-N in order to generate the desired output precision reference voltage VN.

Accordingly, the MCVR of block 14,002 can generate a plurality of desired output reference voltages in response to applied VID codes by use of pulse width modulation units, where the PWM units output is filtered to produce the desired output precision reference voltage.

Each PWM unit is trimmed using a test stand as shown by exemplary test stand 402 and DVM 410 so that microprocessor 14,004 generates the appropriate on off signals. Control block 14,012 receives the control signals from test stand 402, etc., and in response to input from control block 14,012 along line 14,014, microprocessor 14,004 adjusts the on off signals applied to the relevant PWM unit to generate the desired output voltage.

As a further alternative embodiment of the invention, a test stand and feedback circuit controlling settings of a multiprocessor can trim settings of a wide variety of functions. For example, any setting which depends upon a DC voltage level may be trimmed by the test stand and DVM adjusting settings in a microprocessor as shown in FIG. 4.

For example, a current limit setting may be trimmed, as also an overvoltage limit may be trimmed by use of a test stand and a microprocessor controlled system as shown in FIG. 4.

As a further example, temperature compensation may be trimmed by the test stand and microprocessor arrangement of FIG. 4. For example, the power stage temperature dependence may be written into a table stored in the memory of the microprocessor. A temperature sensor, for example temperature sensor 13,020 or 14,020, etc., may then supply the microprocessor with temperature dependent voltage as a temperature signal. The microprocessor, in response to the table and the temperature signal, may then adjust the output voltage to compensate for changes in temperature of the apparatus.

As a further example, the microprocessor may have a table of temperature dependence of a DAC used in its circuit for generation of a precision reference voltage, and may compensate, in response to a temperature signal and the table, the output which it applies to the DAC. Compensating the output of the microprocessor to the DAC then provides temperature compensation to the output precision reference voltage as the temperature of the apparatus varies over a wide range.

Figure 15:
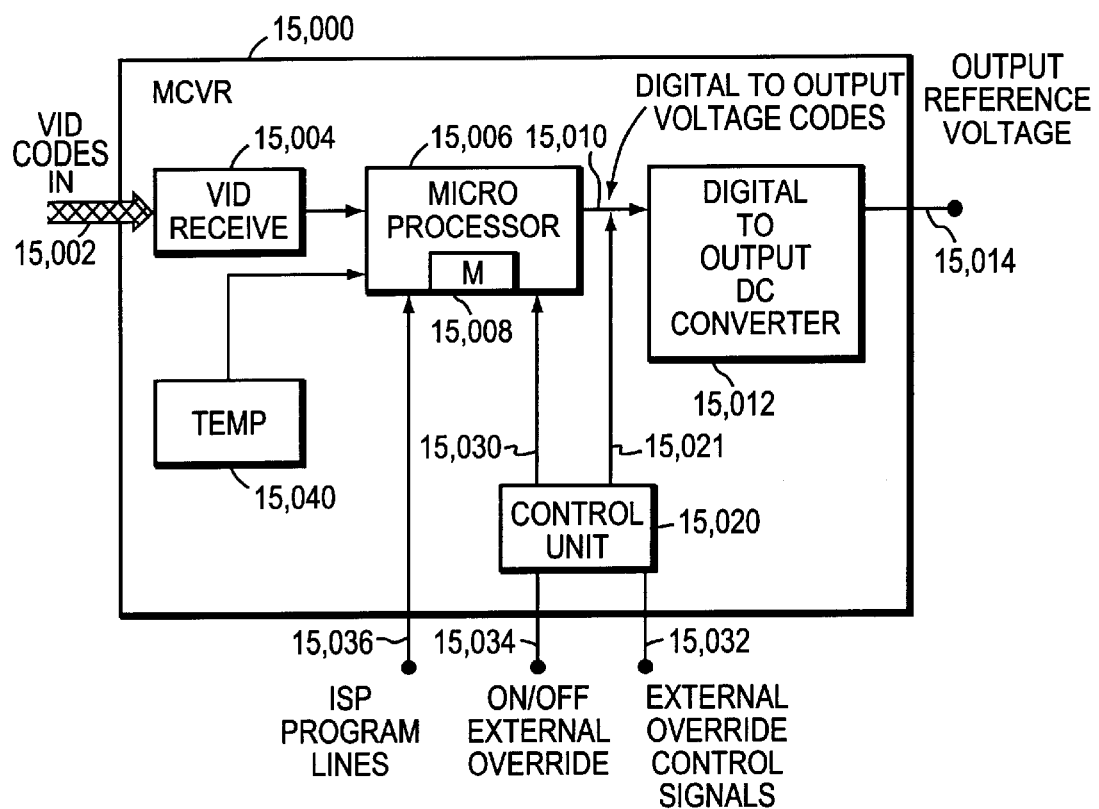
FIG. 15 is a block diagram of a alternative MCVR.

Turning now to FIG. 15, there is shown a block diagram of an alternative embodiment of a microprocessor controlled voltage reference 15,000.

VID codes are received from lines 15,002 by the VID receive block 15,004. VID receive block 15,004 processes the received VID codes and supplies them to microprocessor 15,006. Microprocessor 15,006, using memory 15,008 and in response to the VID codes, generates a digital to output voltage codes at line 15,010. Digital to output DC converter 15,012 receives the digital to output voltage codes from line 15,010 and generates a desired reference voltage on connection 15,014.

Control unit 15,020 receives external override signals along line 15,032, and can override the digital output voltage codes generated by microprocessor 15,006 at line 15,010 by applying the override signals through line 15,021. Control unit 15,020 also applies override and control signals to microprocessor 15,006 through line 15,030.

Control unit 15,020 receives external override control signals along line 15,032. Also, control unit 15,020 receives on/off external override signals along line 15,034. Microprocessor 15,006 may be programmed through ISP program lines 15,036.

Temperature sensor 15,040 measures the temperature in the environment of MCVR 15,000, and in response to the measured temperature applies a temperature dependent signal to processor 15,006. The temperature dependence of MCVR 15,000, along with any device connected to output voltage reference 15,014 is determined by careful measurement, and the response to temperature is recorded in a table stored in processor 15,006 memory 15,008. In response to the temperature dependent signal received by processor 15,006, the processor alters its output digital to output voltage codes to maintain a final output voltage constant as temperature varies.

Figure 16:
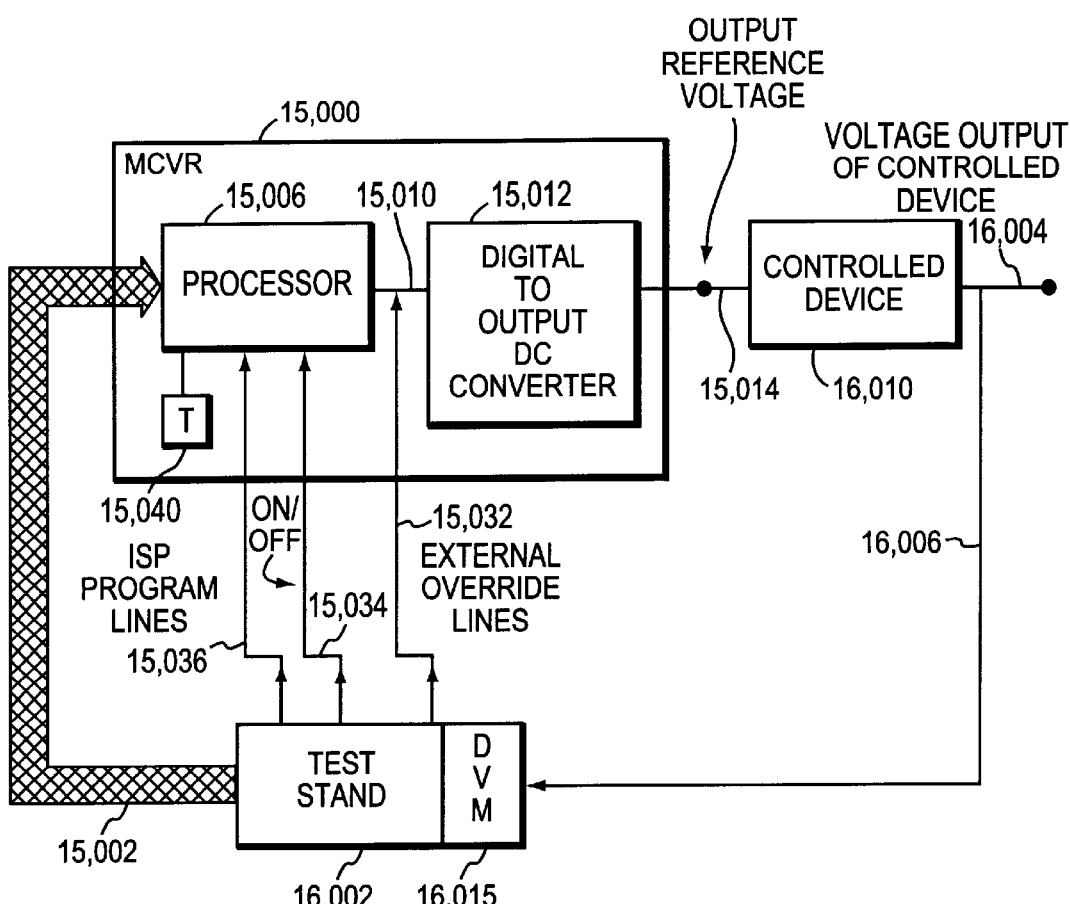
FIG. 16 is a block diagram of an alternative MCVR connected to a test stand.

Turning now to FIG. 16, MCVR 15,000 is shown connected to test stand 16,002. Test stand 16,002 generates a VID code and applies it to MCVR 15,000 through VID lines 15,002. In response MCVR 15,000 generates a reference output DC voltage at line 15,014. The reference voltage on line 15,014 is applied to a controlled device 16,010.

Controlled device 16,010, in response to the reference voltage on line 15,014, generates power at a desired voltage at output 16,004, where the desired voltage is specified by the VID code on line 15,002. Test stand 16,002 overrides the microprocessor digital output voltage codes on line 15,010, and supplies substitute digital output voltage codes through external override lines 15,032. Test stand 16,002 also measures the output voltage at output 16,004 by line 16,006 which connects to digital voltmeter (DVM) 16,015. DVM 16,015 measures the output voltage at output 16,004 and in response, test stand 16,002 adjusts the digital output voltage codes applied by external override lines 15,032 in order to obtained the desired output voltage as specified by the VID codes applied through lines 15,002.

Once test stand 16,002 determines the correct digital output voltage codes needed to obtain the desired output voltage at output 16,004, then the processor 15,006 is programmed through ISP program lines 15,036 to produce the necessary digital output voltage codes at line 15,010 in response to the VID code applied along VID lines 15,002.

This programming of processor 15,006 by test stand 16,002 causes controlled device 16,010 to produce the desired voltage at output 16,004 independently of tolerances of components used to construct controlled device 16,010. That is, during manufacture of controlled device 16,010, manufacturing tolerances of components used to make controlled device 16,010 cause different units to generate different voltages at output 16,004 when the same reference voltage is applied at line 15,014. Adjustment of digital to output voltage codes at line 15,010 changes the output reference voltage applied at line 15,014 so that the desired output voltage is produced at output 16,004 in response to the VID code applied at VID lines 15,002.

The test stand programming of processor 15,006 then permits a given manufactured set of MCVR 15,000 and controlled device 16,010 to generate the desired output voltage at output 16,004 in response to a VID code applied by VID lines 15,002.

Temperature sensor 15,040 measures the environmental temperature, and in response processor 15,006 changes the output reference voltage at output 15,014 in order to maintain the voltage output at output 16,004 constant. That is, the table stored in processor memory 15,008 is accessed in response to the temperature dependent signal generated by temperature sensor 15,040, the digital to output voltage codes modified so as to change the output reference voltage at output 15,014, and in response to the changes in the reference voltage at output 15,014, then controlled device 16,010 maintains a constant output voltage at output 16,004 as the environmental temperature varies.

Temperature sensor 15,040 may be mounted on a computer card holding MCVR 15,000, may be mounted on a card holding controlled device 16,010, or may be mounted in some other convenient location. The important point is that temperature sensor 15,040 be calibrated so that the table is maintained to keep the output voltage at output 16,004 constant as the temperature varies.

It is to be understood that the above described embodiments are simply illustrative of the principles of the invention. Various other modifications and changes may be made by those skilled in the art which embody the principles of the invention and fall within the spirit and scope thereof.

What is claimed is:

1. A power generating device, comprising:
    a digital input to receive Voltage Identification codes (VID codes) from a computer;
    a microprocessor to read said VID codes and to output, in response to a selected VID code, an intermediate digital code;
    a digital to output DC converter, responsive to said intermediate digital code, to output a reference voltage; and,
    a test stand to measure an output voltage of said power generating device, said output voltage developed in response to said reference voltage, and to adjust the intermediate digital code to supply, in response to a desired VID code, a desired said output voltage of said power generating device.

2. The apparatus as in claim 1 wherein said power generating device further comprises:
    a power supply to supply electric power to said computer at said desired output voltage in response to said VID code.

3. The apparatus as in claim 1 wherein said digital to output DC converter further comprises:
    a DAC device to obtain said reference voltage.

4. The apparatus as in claim 1 wherein said digital to output DC converter further comprises:
    a pulse width modulated (PWM) device to obtain said reference voltage.

5. A power supply for a computer, comprising:
    a digital input to receive Voltage Identification codes (VID codes) from the computer;
    a microprocessor to read said VID codes and to output, in response to a VID code, a digital to analog converter code (DAC code);
    a digital to analog converter for receiving said DAC codes, and for outputting a reference voltage; and,
    a test stand to measure an output voltage of said power supply, said output voltage developed in response to said reference voltage, and to adjust the DAC code to supply, in response to a desired VID code, a desired output voltage of said power supply.

6. A power supply as in claim 5, further comprising:
    a microprocessor control voltage reference unit (MCVR unit) and a DC to DC unit, said MCVR unit supplying said reference voltage to said DC to DC unit, said MCVR unit receiving said VID code, and said DC to DC unit outputting power at said output voltage level in response to said reference voltage.

7. A power supply for a computer, comprising:
    a digital input to receive Voltage Identification codes (VID codes) from the computer;
    a microprocessor to read said VID codes and to output, in response to a VID code, a pulse width modulation signal;
    a pulse width modulation circuit, responsive to said pulse width modulation signal, for outputting a reference voltage;
    a DC to DC unit receiving said reference voltage, said DC to DC unit generating an output voltage in response to said reference voltage; and,
    a test stand to measure said output voltage, said output voltage developed in response to said VID code, and said test stand to adjust said DAC code generated by said microprocessor in response to said VID code to supply power at a desired output voltage from said power supply.

8. The apparatus as in claim 1 or claim 6 or claim 7 further comprising:
    a temperature sensor, said temperature sensor providing a temperature dependent signal to said microprocessor, said microprocessor responding to said signal to maintain said output voltage constant as the temperature varies.

9. A method for trimming a voltage generating device, comprising:
    receiving a Voltage Identification code (VID code) from a computer;
    reading said VID code by a microprocessor, said microprocessor outputting, in response to said VID code, an intermediate digital code;
    outputting a reference voltage by a digital to output DC converter, in response to said intermediate digital code;
    measuring an output voltage of said voltage generating device by a test stand; and
    adjusting said intermediate digital code by said test stand to supply, in response to a desired VID code, a desired output voltage by said voltage generating device.

10. The method of claim 9 further comprising:

supplying electric power to said computer at said desired output voltage in response to said VID code.

11. The method of claim 9 further comprising:

using a DAC device for said digital to output DC converter.

12. The method of claim 9 further comprising:

using a pulse width modulation unit for said digital to output DC converter.

13. The method as in claim 9 further comprising:

maintaining said output voltage constant as a temperature of said voltage generating device varies by measuring said temperature using a temperature sensor, said temperature sensor providing a temperature dependent signal to said microprocessor, said microprocessor responding to said signal to maintain said output voltage constant as said temperature varies.

14. A method for trimming a voltage generating device, comprising:

receiving a Voltage Identification code (VID code) from a computer;

reading said VID code by a microprocessor, said microprocessor outputting, in response to said VID code, an intermediate digital code;

outputting a reference voltage by a digital to output DC converter, in response to said intermediate digital code;

measuring an output voltage of said voltage generating device by a test stand, said output voltage generated in response to said reference voltage;

adjusting said voltage generating device, by use of said test stand, so that the intermediate digital code causes a desired output voltage to be supplied by said voltage generating device, said desired output voltage being supplied in response to a desired VID code; and removing said voltage generating device from said test stand, said voltage generating device maintaining a correspondence between said desired VID code and said desired output voltage after removal from said test stand.

15. The method as in claim 14 wherein said power generating device further comprises:

supplying electric power to said computer at said desired output voltage in response to said VID code.

16. The method as in claim 14 wherein said digital to output DC converter further comprises:

obtaining said reference voltage by a DAC device.

17. The method as in claim 14 wherein said digital to output DC converter further comprises:

obtaining said reference voltage by a pulse width modulated (PWM) device.

18. The method as in claim 14, further comprising:

supplying said reference voltage to said DC to DC unit by a microprocessor control voltage reference unit (MCVR unit), said MCVR unit receiving said VID code, and a DC to DC unit outputting power at said output voltage level in response to said reference voltage.

19. The method as in claim 14, further comprising:

maintaining said output voltage constant as the temperature varies in response to a temperature sensor, said temperature sensor providing a temperature dependent signal to said microprocessor.

20. A voltage generating device, comprising:

a microprocessor to read a Voltage Identification code (VID code) received from a computer, said microprocessor outputting, in response to said VID code, an intermediate digital code;

a digital to output DC converter to output a reference voltage in response to said intermediate digital code; and a test stand to assist in measuring an output voltage of said voltage generating device, said output voltage generated in response to said reference voltage, and adjusting said voltage generating device so that the intermediate digital code causes a desired output voltage to be supplied by said voltage generating device, said desired output voltage being supplied in response to a desired VID code, and so that upon removal from said test stand said voltage generating device maintains a correspondence between said desired VID code and said desired output voltage.

21. The apparatus as in claim 20 wherein said power generating device further comprises:

means for supplying electric power to said computer at said desired output voltage in response to said VID code.

22. The apparatus as in claim 20 wherein said digital to output DC converter further comprises:

a digital to analog converter (DAC) device.

23. The apparatus as in claim 20 wherein said digital to output DC converter further comprises:

a pulse width modulated (PWM) device to obtain said reference voltage.

24. The apparatus as in claim 20, further comprising:

means for supplying said reference voltage to said DC to DC unit by a microprocessor control voltage reference unit (MCVR unit), said MCVR unit receiving said VID code, and a DC to DC unit outputting power at said output voltage level in response to said reference voltage.

25. The method as in claim 20, further comprising:

means for maintaining said output voltage constant as the temperature varies in response to a temperature sensor, said temperature sensor providing a temperature dependent signal to said microprocessor.

* * * * *